United States Patent [19]
Okamoto et al.

[11] 3,798,524
[45] Mar. 19, 1974

[54] DIGITAL SERVO COMPRISING MEANS FOR CONTROLLING DRIVING ENERGY IN RESPONSE TO DROOP

[75] Inventors: Kiyokazu Okamoto; Hitoshi Tamagawa, both of Tokyo, Japan

[73] Assignee: Nippon Electric Company, Limited, Tokyo, Japan

[22] Filed: Feb. 20, 1973

[21] Appl. No.: 333,471

[30] Foreign Application Priority Data
Feb. 19, 1972 Japan.............................. 47-17437

[52] U.S. Cl................. 318/571, 318/600, 318/603
[51] Int. Cl. ........................................ G05b 19/24
[58] Field of Search.................... 318/571, 600, 603

[56] References Cited
UNITED STATES PATENTS

| | | | |
|---|---|---|---|
| 3,353,161 | 11/1967 | Toscano.......................... | 318/603 X |
| 3,644,720 | 2/1972 | Falk................................ | 318/603 X |
| 3,512,064 | 5/1970 | Okamato et al.................... | 318/571 |
| 3,566,240 | 2/1971 | Okamoto et al..................... | 318/600 |

*Primary Examiner*—B. Dobeck
*Attorney, Agent, or Firm*—Ostrolenk, Faber, Gerb & Soffen

[57] ABSTRACT

Supplied with driving energy, a digital servo system drives a controlled member with inevitable droop and produces an alarm signal representing whether or not the droop is within a predetermined range. A control pulse generator produces control pulses when the droop is within the range. A reversible counter accumulates an instantaneous number of command pulses supplied to the system in compliance with the sign indicated by a direction command signal also supplied to the system. The control pulses, when produced, reduce the number towards zero. In compliance with the absolute value of the number, the counter adjusts the energy.

5 Claims, 7 Drawing Figures

3,798,524

DIGITAL SERVO COMPRISING MEANS FOR CONTROLLING DRIVING ENERGY IN RESPONSE TO DROOP

BACKGROUND OF THE INVENTION

This invention relates to a digital servo system, such as the digital driving equipment disclosed in Japanese Patent Publication No. Syo 45-25047 (British Patent No. 1,343,855) and U.S. Pat. No. 3,512,064. Digital driving equipment similar to that disclosed in the above-cited patent in view of the present invention is also described in Japanese Patent Publication No. Syo 46,4694 (British Pat. No. 1,238,217) and U.S. Pat. No. 3,566,240.

In general, digital driving equipment causes displacement of a controlled member, such as a table or a tool holder of a machine tool, by means of a motor which may be an electric or a hydraulic motor and is driven by a driving signal produced in response to input pulses and to a direction command signal. The controlled member is moved towards a commanded position identified by the instantaneous number of the input pulses accumulated in compliance with the sign specified by the direction command signal. In other words, the digital driving equipment carries out follow-up of the successively commanded positions, reducing the droop, namely, the difference between the instantaneous actual position of the controlled member and the commanded position, each time an input pulse is supplied thereto together with the direction command signal. It is, however, to be noted that the digital driving equipment fails to carry out the follow-up when the droop is outside of a predetermined range. As will later be described in greater detail with reference to the accompanying drawings, the digital driving equipment revealed in the patent specification primarily referenced above comprises an alarm signal device mechanically coupled to the controlled member for producing an alarm signal which assumes a first value when the droop is within the predetermined range. The alarm signal assumes a second value when the droop falls outside of the predetermined range. The equipment further comprises a control device for allowing the driving signal to be produced when the alarm signal assumes the first value. The control device inhibits production of the driving signal when the alarm signal assumes the second value. In this manner, the equipment keeps the droop within the predetermined range to avoid failure of the follow-up. The digital driving equipment according to the secondarily cited patent also comprises equivalent devices, while a step motor is specifically used as the motor.

Inasmuch as the digital driving equipment according to the referenced patents carries out the follow-up by production and inhibition of the driving signal in response to the alarm signal, the motor is not always supplied with the driving signal. The renders it impossible to sufficiently utilize the ability of the motor and reduces the speed of the follow-up. These disadvantages become intolerable when the allowable range of the droop is narrow. In addition, the droop becomes larger with an increase in the pulse rate of the input signal as will be analysed below.

SUMMARY OF THE INVENTION:

It is therefore an object of the instant invention to provide a digital servo system for driving a motor with sufficiently high efficiency.

It is another object of this invention to provide a digital servo system capable of carrying out the follow-up at a high speed.

It is still another object of this invention to provide a digital servo system capable of carrying out the follow-up with input pulses of a sufficiently high pulse rate.

It is yet another object of this invention to provide a digital servo system capable of operating with a narrow range of the droop permissible to insure follow-up operation of the system.

According to the present invention, there is provided an improvement in a prior art digital servo system for causing displacement of a controlled member by means of a motor driven by a driving signal produced in response to input pulses and a direction command signal. The controlled member is moved towards a commanded position identified by the instantaneous number of the input pulses accumulated in compliance with the sign specified by the direction command signal. The prior art digital servo system comprises alarm signal means mechanically coupled to the controlled member and responsive to the input pulses and the direction command signal for producing an alarm signal which assumes a first value when the droop is within a prescribed range. The alarm signal assumes a second value when the droop falls outside of the prescribed range. The improvement comprises a control signal generator responsive to the alarm signal for producing a control signal which contains control pulses of a predetermined pulse rate (a relatively high pulse rate) when the droop is within the prescribed range to make the alarm signal assume the first value. The control signal contains no control pulses when the droop falls outside of the prescribed range to make the alarm signal assume the second value. The improvement further comprises a reversible counter device responsive to command pulses and a sign signal supplied to the digital servo system and responsive further to the control signal for reversibly accumulating therein the number of the command pulses in compliance with the sign specified by the sign signal when the control signal contains no control pulses. The reversible counter device changes the number accumulated therein towards zero in compliance with the control pulses if contained in the control signal. In either event, the reversible counter device produces a counter output signal representative of the number accumulated therein. The improvement still further comprises driving signal means supplied with the control signal and the counter output signal for producing the driving signal for the motor. On producing the driving signal, the driving signal means uses the control pulses as the input pulses. In addition, the driving signal means uses the sign of the number accumulated in the reversible counter device and represented by the counter output signal as the direction command signal. Responsive to the absolute value of the number given also by the counter output signal, the driving signal means provides control on the energy of the driving signal.

DESCRIPTION OF THE PREFERRED EMBODIMENTS

Figure 1:
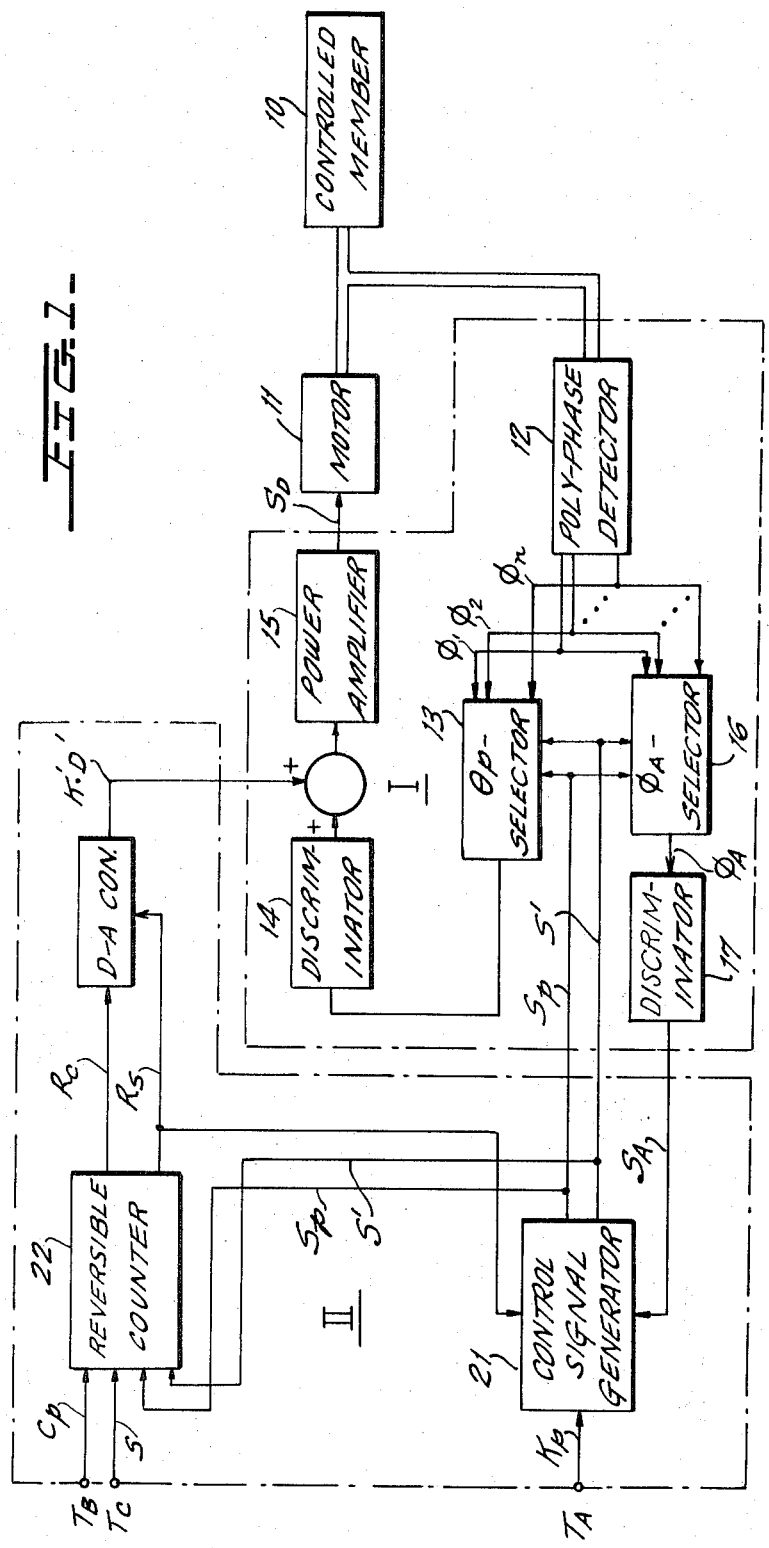
FIG. 1 is a block diagram of a first embodiment of the present invention.

Referring to FIG. 1, the digital driving equipment disclosed in the patent specification primarily referred to hereinabove will at first be described in order to facilitate understanding of the principles on which the instant invention is based. In accordance with the referenced patent, the digital driving equipment illustrated in a block I causes displacement of a controlled member 10, such as a table or a tool holder of a machine tool, by means of a motor 11 which may be an electric or an oil motor and is driven by a driving signal $S_D$ produced in response to input pulses $S_P$ and a direction command signal $S'$. The equipment comprises a poly-phase detector 12 mechanically coupled to the motor shaft for producing poly-phase position signals $\phi_1$ through $\phi_n$ and a positioning phase signal selector 13 which selects a positioning phase signal $\phi_P$ from among the poly-phase position signals $\phi_1$ through $\phi_n$ in the manner later described in response to the input pulses $S_P$ and the direction command signal $S'$. Alternatively, the poly-phase detector 12 may be coupled to the controlled member 10. The equipment further comprises a first phase discriminator 14 and a power amplifier 15. The phase discriminator 14 discriminates the phase of the positioning phase signal $\phi_P$ to produce a discrimination signal and is accompanied by a pre-amplifier (not shown) for pre-amplifying the discrimination signal. The power amplifier 15 power-amplifies the pre-amplified discrimination signal to produce the driving signal $S_D$ for the motor 11. The equipment still further comprises an alarm phase signal selector 16 and a second phase discriminator 17. Supplied with the input pulses $S_P$ and the direction command signal $S'$, the alarm phase signal selector 16 selects an alarm phase signal $\phi_A$ from among the poly-phase positioning signals $\phi_1$ through $\phi_n$. The second phase discriminator 17 discriminates the phase of the alarm phase signal $\phi_A$ to produce a discrimination signal and is accompanied by a comparator (not shown) for comparing the discrimination signal with a preselected reference value to produce an alarm signal $S_A$ of a logic 0 or a logic 1 in accordance with the result of comparison.

Figure 2:
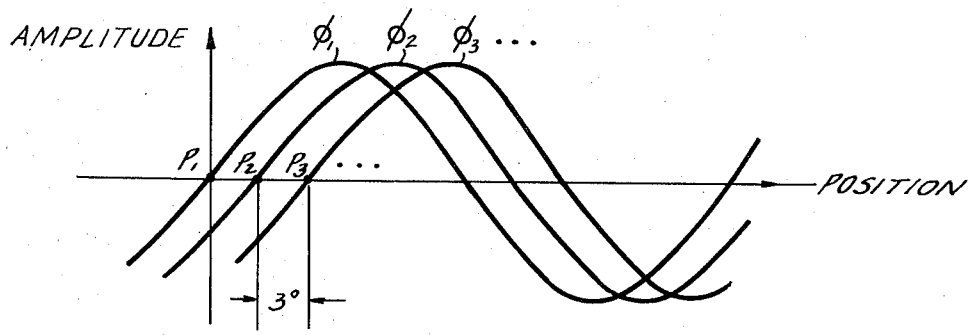
FIGS. 2 through 4 are drawings for explaining the operation of the first embodiment.

Referring to FIGS. 1 and 2, the poly-phase position signals $\phi_1$ through $\phi_n$ produced by the poly-phase detector 12 have wave forms similar to sine curves of prescribed phase difference, such as 3°. The instantaneous amplitudes of the poly-phase position signals $\phi_1$ through $\phi_n$ represent the instantaneous position of the controlled member in terms of the angle of rotation of the motor shaft. As will soon be understood, the points $P_1, P_2, P_3, \ldots$ at which the respective poly-phase position signals $\phi_1, \phi_2, \phi_3, \ldots$ have zero amplitudes represent commanded positions of the controlled member 10. It is described in detail in the referenced patent specification that the positioning phase signal selector 13 comprises an $n$-stage reversible ring counter for accumulating therein the number of the input pulses $S_P$ in accordance with the sign specified by the direction command signal $S'$. The output signals of the respective stages are logic 0 except for only one of the output signals that becomes logic 1 when the instantaneous number of the input pulses $S_P$ accumulated therein is congruent with the stage number modulo $n$. For example, the output signal of only the third stage is logic 1 when the point $P_3$ is the current commanded position. If an input signal is supplied to the reversible ring counter under the circumstances together with the direction command signal $S'$ indicative of the minus sign, the output signal of the second stage turns to logic 1 in correspondence to the fact that the current commanded position is changed to the point $P_2$. The selector 13 further comprises AND gates, $n$ in number, each having a first and a second input terminal. The first input terminals of the AND gates are supplied with the output signals of the respective stages of the reversible ring counter. Only one of the AND gates is enabled in response to the logic 1 output signal of the associated stage. The second input terminals of the AND gates are supplied with the poly-phase position signals $\phi_1$ through $\phi_n$ in compliance with the stage numbers with which the respective first input terminals are associated. The selector 13 still further comprises an OR gate for performing OR-logic operation of the output signals of the AND gates to produce the positioning phase signal $\phi_P$. It is now understood that the positioning phase signal $\phi_P$ is one of the poly-phase position signals $\phi_1$ through $\phi_n$ that is indicative of the current commanded position and that the phase thereof is indicative of the droop. Consequently, the pre-amplified phase discrimination signal produced by the first phase discriminator 14 is a direct current signal of the polarity representative of the sense in which the controlled member 10 should be moved to reach the commanded position. The driving signal $S_D$ drives the motor 11 in the sense for bringing the controlled member 10 to the current commanded position. If no input pulse appears in the mean time, the controlled member 10 eventually reach the commanded position, when the amplitude of the related one of the poly-phase position signals and hence the driving signal $S_D$ become zero.

Figure 3:
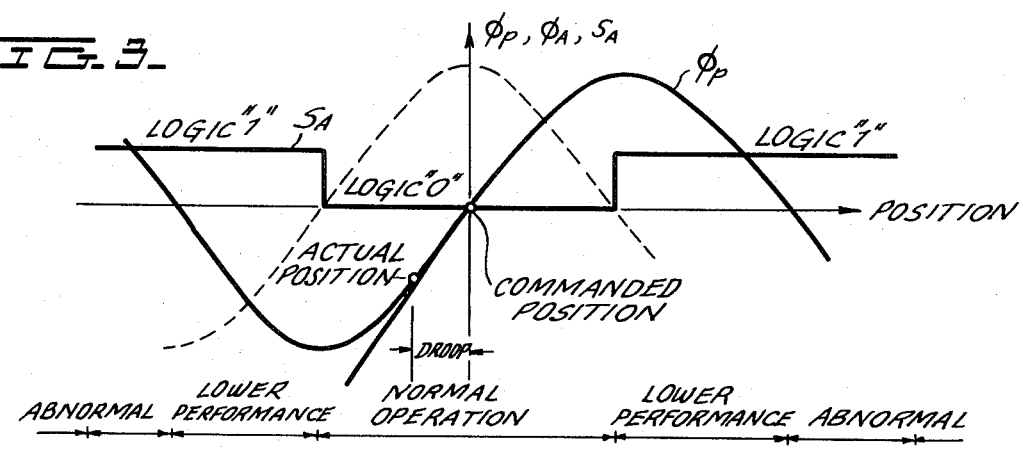

Referring to FIGS. 1 through 3, the instantaneous amplitude of the positioning phase signal $\phi_P$ is proportional to the droop in the neighbourhood of the related commanded position. Accordingly, the positioning servo system shown in the block I serves as a normal linear servo system. It is to be noted that the droop tends to increase in proportion to the rate of the input pulses $S_P$ and also increases with an increase in the load of the motor 11. In contrast, the amplitude of the positioning phase signal $\phi_P$ is determined by the performance of the poly-phase detector 12 and is neither affected by the rate of the input pulses $S_P$ nor by the load of the motor 11. If the droop is within the ±90° range referenced in FIG. 3 as "normal operation," the servo system is duly operable. If the droop falls outside of the ±90° range but within the ±180° range as indicated by "lower performance," the energy of the driving signal $S_D$ decreases with an increase in the droop to impair the follow-up ability of the servo system. If the droop becomes greater than the ±180° range as labelled "abnormal," the servo system mis-operates to drive the controlled member 10 away from the commanded position. As described in detail in the referenced patent specification, the alarm phase signal selector 16 is similar to the positioning phase signal selector 13 in structure and serves to select the alarm phase signal $\phi_A$ from among the poly-phase position signals $\phi_1$ through $\phi_n$. The alarm phase signal $\phi_A$ has a predetermined phase difference, such as 90°, with respect to the positioning phase signal $\phi_P$. When the droop is within a prescribed range, such as the ±90° range, the alarm signal $S_A$ produced by the second phase discriminator 17 assumes a first value of logic 0 to enable a gate device (not shown) for allowing passage of the input pulses $S_P$ to the servo system. When the droop tends to fall outside of the prescribed range, the alarm signal $S_A$ assumes a second value of logic 1 to disable the gate device. The servo, system is thus insured to perform the normal operation.

Explanation will now be given with regard to the principles of the instant invention which insure high accuracy follow-up of the servo system and full utilization of the motor ability.

Assuming that the system gain of the positioning servo system shown in the block I is K, the feed rate of the input pulses $S_P$ is F, and the droop is D, the relationship among these is given by $$F = K.D \qquad (1)$$

in case that the servo system is linear. It is recalled here that the droop has generally a maximum permissible value $D_{max}$ which results principally from the characteristics of the poly-phase detector 12. From Equation (1), the maximum feed rate $F_{max}$ of the input pulses $S_P$ which can drive the controlled member 10 to keep the follow-up motion is given by $$F_{max} = K.D_{max} \qquad (2)$$

in which the maximum droop $D_{max}$ is an invariant in a given servo system. It is now understood from Equation (2) that the maximum feed rate $F_{max}$ for the system may be increased if either the system gain K is raised or if a second term is added to the right side of Equation (2).

The first embodiment of the present invention illustrated in FIG. 1 is based on the principles of adding a term $K'.D'$ to the righthand side of Equation (2) as the second term. The relationship between the system gain K, the feed rate F, and the droop D is now given by $$F = K.D + K'.D' \qquad (3)$$

in which the first term of the righthand side has a maximum $K.D_{max}$. It is, however, possible to raise the feed rate F beyond the limit $F_{max}$ given by Equation (2) because of presence of the second term in the righthand side of Equation (3). Rewriting Equation (3), $$F = K.[D + (K'/K).D'] \qquad (4)$$

follows. In Equation (4), it may be assumed that the factor K' is substantially equal to the system gain K.

Figure 4:
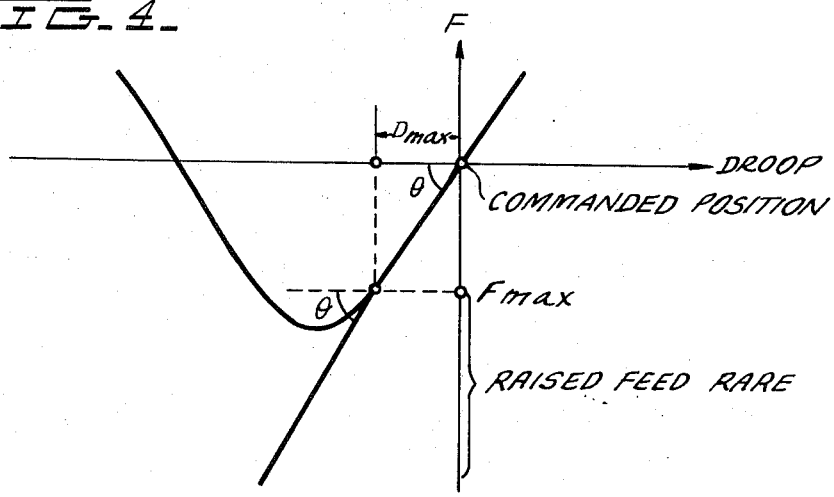
Figure 5:
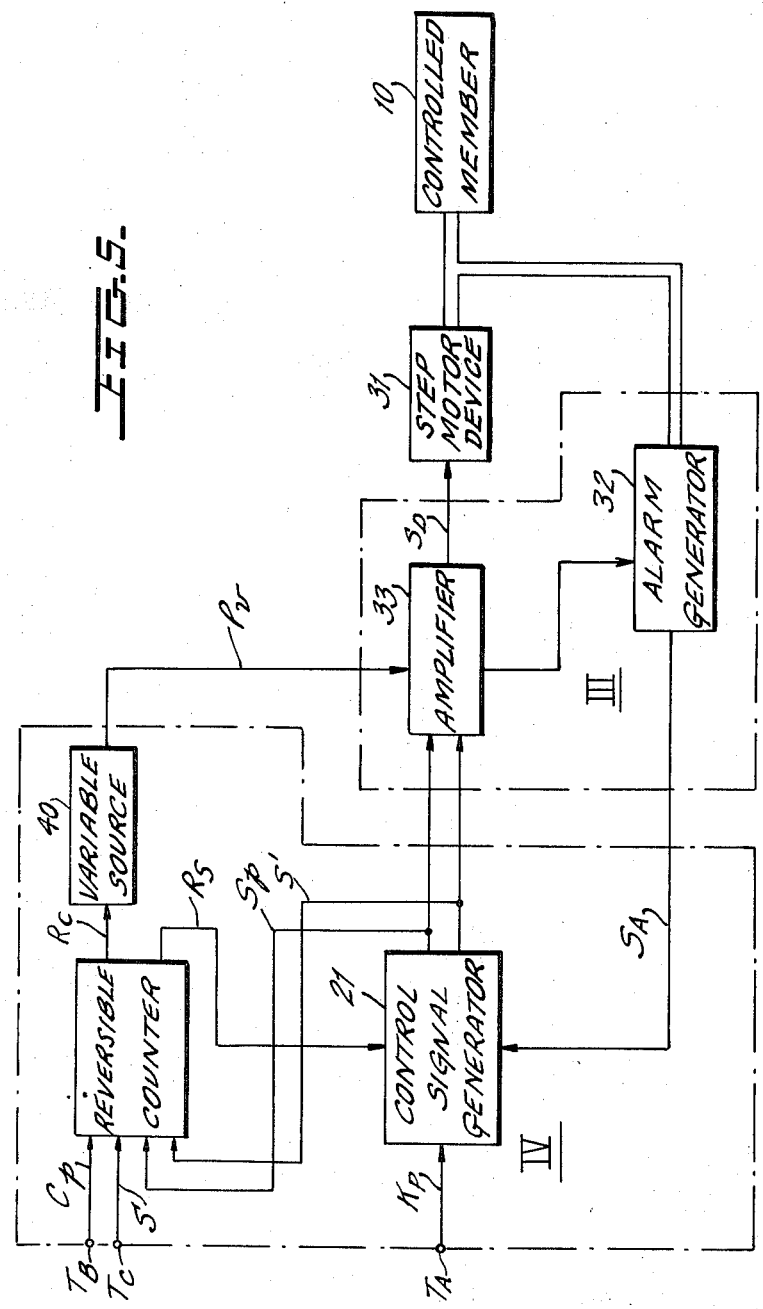
FIG. 5 is a block diagram of a second embodiment of the present invention.

Referring to FIG. 4, the feed rate F and the droop D are depicted for a linear servo system. The system gain K is given by $\tan\theta$, where $\theta$ represents the angle formed by the tangent to a curve corresponding to the positioning phase signal $\phi_P$ of the substantially linear portion and the axis of abscissa. Addition of the second term in Equation (4) corresponds to extension of the tangent, although the exact angle $\theta'$ formed by the extension and the axis of abscissa is given by $\arctan K'$. It is possible according to the first embodiment to raise the feed rate F as illustrated with a brace along the axis of ordinate.

Turning back to FIG. 1, the first embodiment of the present invention comprises, in addition to the devices 12, 13, 14, 15, 16, and 17 illustrated in the block I, devices 21, 22, and 23 shown in a block II as well as an adder 25 depicted in the block I. The device 21 is a control signal generator supplied with the alarm signal $S_A$ and with high frequency pulses $K_P$ applied to an input terminal $T_A$. When the droop is within the prescribed range to make the alarm signal $S_A$ assume the first value of logic 0, the control signal generator 21 produces control pulses $S_P$ of the same pulse rate as the high frequency pulses $K_P$. When the droop tends to fall outside of the prescribed range to make the alarm signal $S_A$ assume the second value of logic 1, the control signal generator 21 terminates production of the control pulses $S_P$. The device 22 is a reversible ring counter device supplied with conventional command pulses $C_P$ and a direction control signal S through input terminals $T_B$ and $T_C$, respectively. The command control signal S is what is generally called the direction command signal in conventional digital driving equipment techniques. The counter device 22 reversibly accumulates therein the instantaneous number of the command pulses $C_P$ in compliance with the sign specified by the direction control signal S. The output signal of the counter device 22 is a coded signal representative of the current counts accumulated therein. A first portion of the coded signal is a code signal $R_C$ representative of the absolute value of the current number accumulated in the counter device 22. A second portion of the coded signal is a sign signal $R_S$ indicative of the sign of the instantaneous number. The sign signal $R_S$ is partly supplied to the control signal generator 22 to become a direction command signal S'. The counter device 22 is further supplied with the control pulses $S_P$ and the direction command pulses S'. If supplied with these signals $S_P$ and S', the counter device 22 changes the number accumulated therein towards zero at a higher rate of the high frequency pulses $K_P$. The device 23 is a digital-to-analog converter supplied with the code signal $R_C$ and the sign signal $R_S$. The digital-to-analog converter 23 produces an analog signal whose instantaneous amplitude is dependent on the digital value represented by the code signal $R_C$ and whose polarity is determined by the sign signal $R_S$. The analog signal is used as a signal representative of the second term $K'.D'$ of Equation (3). The adder 25 adds the analog signal $K'.D'$ to the pre-amplified phase discrimination signal. The control pulses $S_P$ and the direction command signal S' as used as the input pulses and the direction command signal of the servo system.

It should be noted here in regard to the difference between the first embodiment and the equipment of the referenced patent that the phase selectors 13 and 14 are not supplied with the usual commond pulses $C_P$ as such but the control pulses $S_P$ of a high pulse rate, that the alarm signal $S_A$ controls the control signal generator 21 to enable and disable production of the signals $S_P$ and S', and that the analog signal K'.D' produced by the analog-to-digital converter 23 is added to the analog signal dependent on the positioning phase signal $\phi_P$ by the adder 25 to increase the energy of the driving signal $S_D$ for the motor 11.

In operation, let the droop be within the prescribed range. The alarm signal $S_A$ is logic 0. The reversible ring counter device 22 accumulates the count of the command pulses $C_P$ in compliance with the sign specified by the direction command signal S. The control signal generator 21 produces the control pulses $S_P$ of the high pulse rate and the direction control signal S' representative of the same sign as the direction command signal S. Responsive to the control pulses $S_P$ and the direction control signal S', the positioning phase signal selector 13 selects a positioning phase signal $\phi_P$ to prepare for the positioning operation of the servo system.

If the feed rate given by the command pulses $C_P$ increases, the droop may gradually increase to turn the alarm signal $S_A$ to logic 1. The control signal generator 21 stops production of the control pulses $S_P$. The absolute value of the number accumulated in the counter device 22 increases. The instantaneous amplitude of the analog signal K'.D' grows accordingly. The driving signal $S_D$ thereby produced serves to reduce the droop. As soon as the droop decreases to fall within the prescribed range, the high rate control pulses $S_P$ re-appear to reduce the number accumulated in the counter device 22. The instantaneous amplitude of the analog signal K'.D' is reduced. The sum of the first and the second terms in the right side of Equation (3), however, is held substantially constant because the first term K.D. increases as a result of re-appearance of the control pulses $S_P$. Inasmuch as the driving signal $S_D$ is thus substantially constant, the stability of the servo system is maintained.

In practice, the pulse rate of the control pulses $S_P$ is greater than that of the command pulses $C_P$ so that the alarm signal $S_A$ turns to logic 1 to stop generation of the control pulses $S_P$ immediately after the alarm signal $S_A$ becomes logic 0 to start production of the control pulses $S_P$. This intermittent production of the control pulses $S_P$ makes the terms K.D and K'.D' fluctuate. The sum, however, is substantially constant. The digital servo system according to the first embodiment thus makes it possible to raise the follow-up speed and the motor ability even if the characteristics of the polyphase detector 12 provides a narrow range for the permissible droop.

Figure 6:
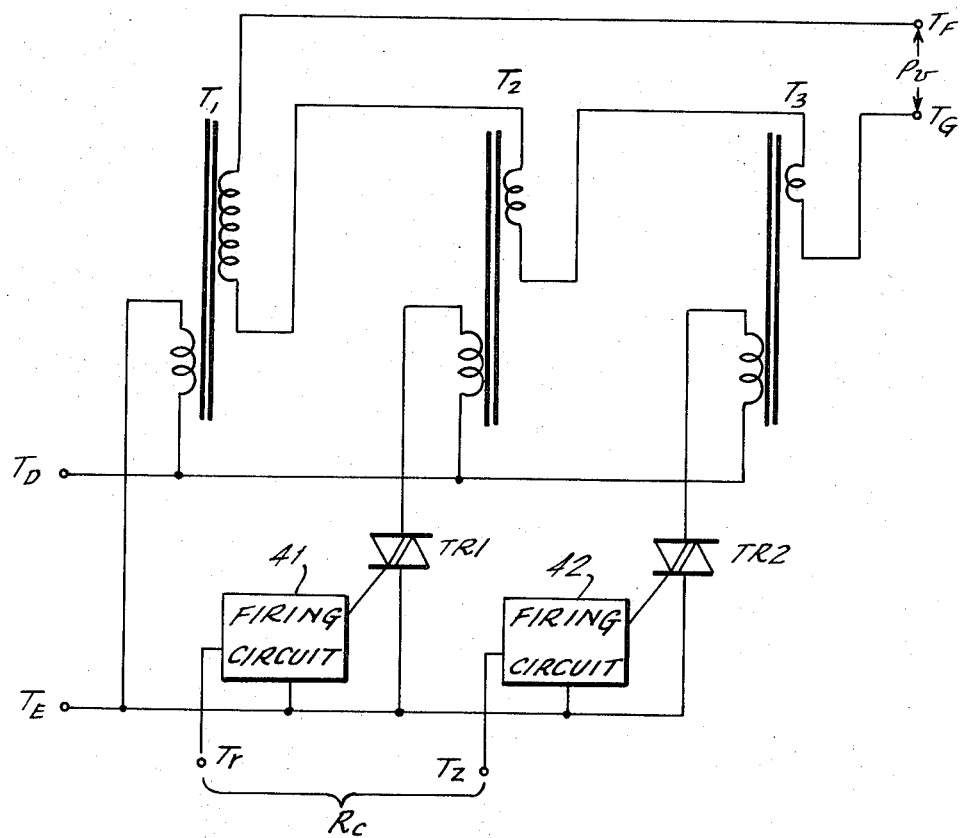
FIG. 6 shows the circuit of a driving amplifier used in the second embodiment, partly in blocks.

Referring to FIG. 6, the digital driving equipment disclosed in the patent specification secondarily referred to hereinabove will now be described in outline. In accordance with the referenced patent, the digital driving equipment illustrated in a block III for a controlled member 10 comprises a step motor device 31 for the controlled member 10, an alarm signal generator 32 coupled to the motor shaft, and a driving signal amplifier 33 for supplying a driving signal $S_D$ to the step motor device 31 in response to input pulses $S_P$ and a direction command signal S'. The driving signal amplifier 33 supplies a signal relating to a current commanded position to the alarm signal generator 32 to make the same produce an alarm signal $S_A$. From the nature of a step motor described in the referenced patent specification, it will be understood that the permissible range of the droop D depends on the step motor itself and that the torque-droop curve of a step motor is similar to a sine curve. In addition, it is understood that a step motor in itself (between the stator and the rotor) forms a servo system because the torque is almost proportional to the droop in the neighbourhood of the stable positions (more precisely, when the angle between the commanded position and the actual position is less than 90°).

As stated previously, the droop tends to increase with an increase in the weight of the load and also increases with an elevation of the feed rate given by the command pulses. On the other hand, these factors contributes nothing to the torque. Furthermore, the torque decreases when the droop exceeds 90° and drives the controlled member 10 away from the commanded position when the droop exceeds 180°. This often makes the step motor fail to follow the rate of the command pulses.

In the digital driving equipment according to the cited patent, these faults are removed by making the alarm signal $S_A$ control supply of the command pulses and the direction command signal to the driving signal amplifier 33 by means of a gate device (not shown) when the droop tends to fall outside of the prescribed range. With the diginal driving equipment, the step motor does not operate efficiently.

Figure 7:
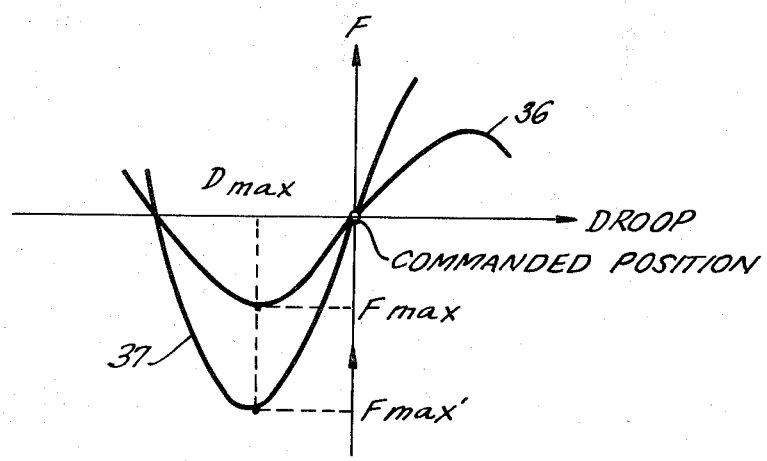
FIG. 7 is a graph for explaining the operation of the second embodiment.

Referring to FIG. 7, the second embodiment is based on the already described principles such that the allowable feed rate F is raised by raising the system gain K. More particularly, the feed rate F corresponding to a positioning phase signal $\phi_P$ is given by a curve 36. The maximum droop for a step motor is 90°. The maximum feed rate $F_{max}$ for a prior art digital servo system is determined as shown by the curve 36. If the system gain is raised, the permissible feed rate is given by another curve 37. The maximum feed rate $F_{max}'$ is greater than the maximum feed rate $F_{max}$ for the conventional servo system.

Turning back to FIG. 6, the second embodiment comprises a block IV for raising the system gain. The block IV comprises a control signal generator 21 and a reversible ring counter device 22 illustrated with reference to FIG. 1. The block IV further comprises a variable power source 40 supplied with the code signal $R_C$ from the counter device 22 for producing a voltage signal $P_V$ determined by the code signal $R_C$.

Referring to FIG. 7, an example of the variable power source 40 has input terminals $T_D$ and $T_E$ between which an alternating current power is applied, output terminals $T_F$ and $T_G$ across which the voltage signal $P_V$ is developed, and another set of input terminals, such as $T_Y$ and $T_Z$ supplied with the respective digits of the code signal $R_C$. For simplicity, it is assumed here that the absolute value of the number accumulated in the counter device 22 is one of from zero to decimal three and consequently that the digits of the code signal $R_C$ supplied to the input terminals $T_Y$ and $T_Z$ are logic 0 and/or logic 1. The variable power source 40 comprises a first transformer $T_1$, a second transformer $T_2$, and a third transformer $T_3$. The primary winding of the first transformer $T_1$ is connected between the power input terminals $T_D$ and $T_E$. The primary winding of the second transformer $T_2$ is connected between the power input terminals $T_D$ and $T_E$ with a first bidirectional thyristor TR1 interposed. Similarly, the primary winding of the third transformer $T_3$ is connected between the power input terminals $T_D$ and $T_E$ with a second bidirectional thyristor TR2 interposed. The secondary windings of the transformers $T_1$ through $T_3$ are connected in series between the output terminals $T_F$ and $T_G$. The variable power source 40 further comprises a first firing circuit 41 for the first thyristor TR1 and a second firing circuit 42 for the second thyristor TR2. The second firing circuit 42 is controlled by the least significant digit of the code signal $R_C$ to fire the second thyristor TR2 in the known manner only when the least significant digit is logic 1. Likewise, the first firing circuit 41 is controlled by the more significant digit of the code signal $R_C$ to make the first thyristor TR1 supply the alternating current power to the primary winding of the second transformer $T_2$ only when the more significant digit is logic 1.

In operation, let it be assumed that the first through the third transformers $T_1$ through $T_3$ provide 4/7, 2/7, and 1/7 of a predetermined voltage on the respective secondary windings when energized. It is readily understood that the variable power source 40 provides 4/7, 5/7, 6/7, and 7/7 of the predetermined voltage as the voltage signal $P_V$ when the code signal $R_C$ represents decimal zero, one, two, and three, respectively. It is noted here than the phase difference among the voltages induced on the secondary windings is negligible and that the second and the third transformers $T_2$ and $T_3$ act as mere low inductive loads when the bidirectional thyristors TR1 and TR2 are truned off.

Turning back again to FIG. 6, let it be assumed that the absolute value of the number accumulated in the reversible ring counter device 22 has grown large as a result of an increase in the feed rate given by the command pulses $C_P$. The variable power source 40 develops a relatively high voltage as the voltage signal $P_V$, which is supplied to the driving signal amplifier 33 for the step motor device 31. The driving signal $S_D$ is thereby further amplified to raise the exciting voltage of the step motor. In a step motor servo system, this corresponds to an increase in the system gain K used in Equation (2). Consequently, it is possible with the second embodiment to increase the speed of follow-up. An increase in the system gain adversely affects the stability of the servo system and results in a poor response to dampling. Slight reduction in the stability, matters little because a high speed of the follow-up operation is generally required in mere positioning. In addition, it is to be pointed out as the positioning operation approaches and end that the command pulses $C_P$ are either stopped or possessed of lowering feed rate. The alarm signal $S_A$ therefore often assumes the first value of logic 0 to reduce the counts accumulated in the counter device 22 towards zero. The voltage of the voltage signal $P_V$ lowers accordingly. This enables the servo system to recover the sufficient stability and the excellent danping characteristics.

Reviewing FIGS. 1 and 6, it will be easy for those skilled in the art to manufacture the control signal generator 21, the reversible ring counter device 22, and the digital-to-analog converter 23 of the characteristics mentioned above. For example, the digital-to-analog converter 23 may be that described in a United Stase periodical, "Electronic Design," Volume 22, pages 50 through 58, dated Oct. 24, 1963. The control pulse generator 21 and the counter device 22 may readily be designed by referring to "TTL Integrated Circuits Catalog," published August 1969 by Texas Instruments.

It should be understood that the digital servo system according to the instant invention is entirely different both in structure and in operation from the digital phase modulation servo system reveled in United States Patent applications Ser. Nos. 136,419 and 136,420 (Series of 1960) wherein use is made of a phase discriminator of an enlarged range.

What is claimed is:

1. A digital servo system for causing displacement of a controlled member by means of a motor driven by a driving signal produced in response to input pulses and a direction command signal, said member being moved towards a commanded position identified by the instantaneous number of said input pulses accumulated in compliance with the sign specified by said direction command signal, said system comprising alarm signal means mechanically coupled to said member and responsive to said input pulses and said direction command signal for producing an alarm signal assuming a first value when the difference between the instantaneous actual position of said member and the instantaneous commanded position is within a prescribed range, said alarm signal assuming a second value when said difference falls outside of said range, wherein the improvement comprises:

control signal means responsive to said alarm signal for producing a control signal containing control pulses of a predetermined pulse rate when said alarm signal assumes said first value, said control signal containing no control pulses when said alarm signal assumes said second value, reversible counter means responsive to command pulses, a sign signal, and said control signal for reversibly accumulating therein the number of said command pulses in compliance with the sign specified by said sign signal when said control signal contains no control pulses and for changing the number accumulated therein towards zero in compliance with the control pulses if contained in said control signal, thereby producing a counter output signal representative of the number accumulated therein, and driving signal means supplied with said control signal and said counter output signal for producing said driving signal, the control pulses contained in said control signal providing said input pulses, said counter output signal providing said direction command signal by the sign of the number accumulated in said reversible counter means and also providing control on said driving signal in compliance with the absolute value of the number accumulated in said reversible counter means.

2. A digital servo system as claimed in claim 1, said counter output signal consisting of a first signal representative of the absolute value of the number accumulated in said reversible counter means and a second signal indicative of the sign of said number, wherein said driving signal means comprises digital-to-analog conversion means responsive to said counter output signal for producing an analog signal whose analog value corresponds to said absolute value and whose polarity is determined by the sign of said number, said analog signal providing control on said driving signal.

3. A digital servo system as claimed in claim 1, said counter output signal containing a digital code signal representative of the absolute value of the number accumulated in said reversible counter means, wherein said driving signal means comprises variable voltage source means responsive to said digital code signal for producing a voltage signal whose voltage corresponds to said absolute value, said voltage signal providing control on said driving signal.

4. A digital servo system as claimed in claim 3, said motor being a step motor, wherein said driving signal means comprises a variable gain amplifier for producing said driving signal, the gain of said amplifier being adjusted in response to said voltage signal.

5. A digital servo system as claimed in claim 3, wherein said variable voltage source means comprises first transformer means having a prescribed turn ratio, a plurality of controllable bidirectional elements, and a plurality of second transformer means having prescribed turn ratios, the primary winding of said first transformer means being connected to an alternating current source, the primary windings of said second transformer means being coupled to said alternating current source through said bidirectional elements, respectively, the secondary windings of said first and second transformer means being connected in series to produce said voltage signal, said variable voltage source means further comprising control circuit means responsive to said digital code signal for selectively turning said bidirectional elements on.

* * * * *